(12) United States Patent
Rasset et al.

(10) Patent No.: US 8,430,426 B2
(45) Date of Patent: Apr. 30, 2013

(54) SUSPENDED CAB ROLLOVER PROTECTION SYSTEM (ROPS) ATTACHMENT FOR A 4WD AGRICULTURAL TRACTOR

(75) Inventors: John T. Rasset, Barnesville, MN (US); Chad A. Bautz, Fargo, ND (US); Daniel J. Zurn, Horace, ND (US)

(73) Assignee: CNH America LLC

( * ) Notice: Subject to any disclaimer, the term of this patent is extended or adjusted under 35 U.S.C. 154(b) by 0 days.

(21) Appl. No.: 13/019,886

(22) Filed: Feb. 2, 2011

(65) Prior Publication Data

US 2012/0193157 A1 Aug. 2, 2012

(51) Int. Cl.
*B60R 21/13* (2006.01)
*B62D 33/06* (2006.01)
*B62D 27/04* (2006.01)

(52) U.S. Cl.
USPC .................. 280/756; 180/89.13; 296/190.03; 296/190.07

(58) Field of Classification Search ................ 280/756; 180/89.1, 89.12, 89.13; 296/1.03, 35.1, 190.04, 296/190.07, 190.03; 267/33, 140, 225, 292; 248/560, 565, 618, 624, 638
See application file for complete search history.

(56) References Cited

U.S. PATENT DOCUMENTS

| | | | |
|---|---|---|---|
| 3,560,019 A | 2/1971 | Moore | |
| 3,754,315 A * | 8/1973 | Heitman | 29/401.1 |
| 3,940,177 A * | 2/1976 | Miers et al. | 296/35.1 |
| 4,116,412 A * | 9/1978 | Walden | 248/635 |
| 4,149,608 A | 4/1979 | Hennessey | |
| 4,294,324 A | 10/1981 | Kimball et al. | |
| 5,074,535 A | 12/1991 | Colford | |
| 5,388,884 A | 2/1995 | Keehner et al. | |
| 5,520,259 A | 5/1996 | Onohara et al. | |
| 5,893,330 A * | 4/1999 | Emery | 105/224.05 |
| 5,964,310 A | 10/1999 | Gyllner | |
| 6,340,201 B1 * | 1/2002 | Higuchi | 296/190.07 |
| 6,478,102 B1 | 11/2002 | Puterbaugh et al. | |

(Continued)

FOREIGN PATENT DOCUMENTS

JP 1049735 A * 2/1989

OTHER PUBLICATIONS

Machine Translation of Takami (JP 1049735 A) / 64-49735, (Translated on Jun. 2012).*

*Primary Examiner* — Joseph Rocca
(74) *Attorney, Agent, or Firm* — Sue C. Watson

(57) ABSTRACT

A cab suspension device for an agricultural tractor comprising a pair of concentrically aligned tubes co-axially arranged around a conventional cab suspension spring apparatus. One of the pair of tubes is connected to the tractor frame while the second is attached to the cab frame. The lengths of the tubes are shorter than the static length of the spring apparatus to allow limited telescoping movement of the tubes during dynamic compression of the spring apparatus without causing contact between the tube ends and the opposing tractor and cab frames. The dynamic extension during telescoping movement of the spring apparatus is controlled by a spring retainer. An annular space between the tubes allows for limited lateral displacement of the spring apparatus without causing contact between the tubes. The limits are configured to permit normal operational movement of the spring apparatus without contact of the tubes. During vehicle roll over events, the normal operational loads of the spring apparatus are exceeded and the tubes will come in contact with one another and/or the opposing frame. The tubes and the spring retainer provide a rigid load transfer path for ROPS loads from the cab to the vehicle frame.

19 Claims, 3 Drawing Sheets

U.S. PATENT DOCUMENTS

| | | |
|---|---|---|
| 6,709,046 B2 * | 3/2004 | Okazawa et al. ........ 296/190.07 |
| 6,986,545 B2 | 1/2006 | Nilsson et al. |
| 7,261,321 B2 | 8/2007 | Della Valle |
| 7,364,223 B2 * | 4/2008 | Mori et al. ............... 296/190.07 |
| 2007/0278811 A1 | 12/2007 | Derham et al. |
| 2009/0289472 A1 | 11/2009 | Catanzarite et al. |

* cited by examiner

SUSPENDED CAB ROLLOVER PROTECTION SYSTEM (ROPS) ATTACHMENT FOR A 4WD AGRICULTURAL TRACTOR

BACKGROUND OF THE INVENTION

The present invention relates to a device for suspending a cab on a work vehicle and, more particularly, to a cab suspension device that is also capable of transferring loads from the rollover protection systems (ROPS) to the vehicle chassis when required.

Construction and agricultural machinery places considerable demands on the operator's cab suspension construction. In order to make the working environment of the driver comfortable, the suspension must be capable of reducing/eliminating the relatively powerful vibrations and shocks which are otherwise transmitted from the vehicle frame to the cab. Moreover, for reasons of safety, the suspension must be sufficiently strong to retain the cab on the frame even if the vehicle should overturn. Typical lighter duty agricultural tractor cab suspensions are designed with pivot connections at the front of the cab and vertical sprung connections at the rear of the cab. This arrangement has been found to be insufficient for heavier duty 4WD agricultural tractors which require moveable connections at the four corners of the cab mounting structure to provide adequate operator comfort. The movable connections must allow the cab to move freely without making hard contact during normal operation.

Agricultural tractors are also required to provide roll over protection systems (ROPS) to protect the operator in the event of a vehicle roll over. A suspended cab with ROPS typically includes a bolted connection with a resilient isolation mount connecting the cab to the frame. Cab movement is limited through this type of connector, but it provides the load capability necessary for the ROPS. As this attachment is relatively rigid, adequate operator ride comfort may not be provided on heavy duty tractors.

It would, therefore, be a great advantage to provide an improved mounting device for supporting a cab on an agricultural tractor frame that allows adequate movement for operator comfort while providing a sufficiently strong connection for transferring the ROPS loads to the frame. Further advantages would be realized by a mounting device that is sufficiently compact to be installed in a similar space occupied by a conventional spring mounting device. Still further advantages result from an improved cab suspension device that allows vertical, lateral and angular movement while still providing a suitably strong load transfer path for the ROPS loads when required.

SUMMARY OF THE INVENTION

Accordingly, the present invention, in any of the embodiments described herein, may provide one or more of the following advantages:

It is an object of the present invention to provide a cab mounting device for an agricultural tractor that allows movement for a cab suspension yet provides a rigid load transfer path between the cab ROPS and the tractor frame.

It is another object of the present invention to provide a cab mounting device for an agricultural tractor that allows vertical, lateral, and angular cab movement during normal tractor operation.

It is a further object of the present invention to provide a suspension device for a tractor cab having a roll over protection system that is similar in size to the normal cab suspension device it is intended to replace.

It is a further object of the present invention to provide a cab suspension device for an agricultural tractor cab that incorporates resilient bumpers to minimize metal-to-metal contact within the device during normal operations.

It is a still further object of the present invention to provide a cab suspension device for an agricultural tractor that is sufficiently robust to withstand expected tractor roll over loads without loss of structural integrity.

It is a still further object of the present invention to provide a suspended cab mounting device for an agricultural tractor having a separate cab suspension apparatus wherein the mounting device will withstand tractor roll over loads without loss of structural integrity.

It is a still further object of the present invention to provide a cab suspension device for a ROPS-equipped agricultural tractor that is durable in construction, inexpensive of manufacture, carefree of maintenance, easily assembled, and simple and effective to use.

These and other objects are achieved by providing a cab suspension device for an agricultural tractor comprising a pair of concentrically aligned tubes co-axially arranged around a conventional cab suspension spring apparatus. One of the pair of tubes is connected to the tractor frame while the second is attached to the cab frame. The lengths of the tubes are shorter than the static length of the spring apparatus to allow limited telescoping movement of the tubes during dynamic compression of the spring apparatus without causing contact between the tube ends and the opposing frames. The dynamic extension during telescoping movement of the spring apparatus is controlled by a spring retainer. An annular space between the tubes allows for limited lateral displacement of the spring apparatus without causing contact between the tubes. The limits are configured to permit normal operational movement of the spring apparatus without contact of the tubes. During vehicle roll over events, the normal operational loads of the spring apparatus are exceeded and the tubes will come in contact with one another and/or the opposing frame. The tubes and the spring retainer provide a rigid load transfer path for RAPS loads from the cab to the vehicle frame.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is a detail view from FIG. 2 showing a vertical compression bumper.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward,"

"left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
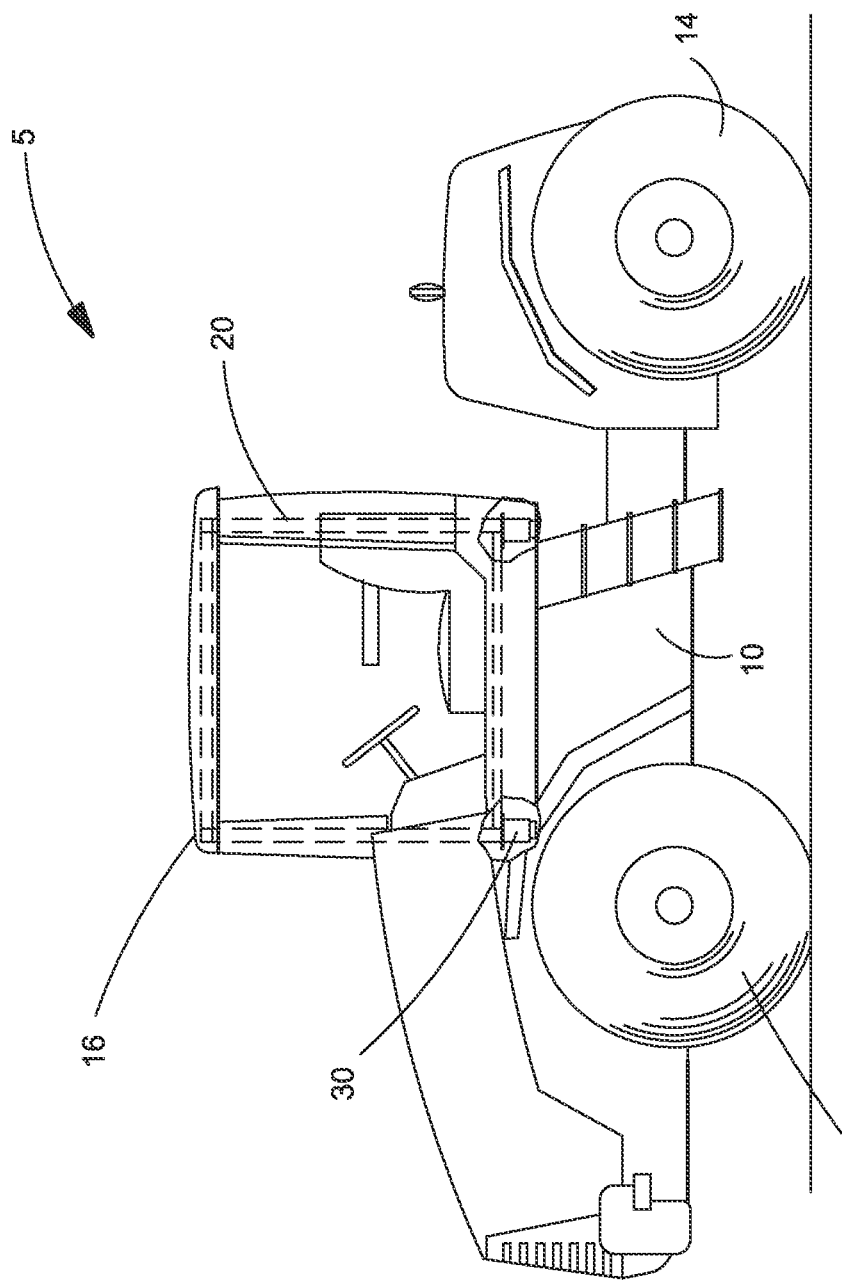
FIG. 1 is a side elevation view of an agricultural actor of the type on which the present invention is advantageous.

Referring now to the drawings, in FIG. 1 there is illustrated a tractor 5 which is a four-wheel drive tractor typically used for such purposes as agriculture, earthmoving, construction, and the like. The STX and TJ series four-wheel drive tractors manufactured by Case New Holland are typical examples of tractors of the type on which the present invention is beneficial. Such tractors feature relatively high horsepower engines for powering larger PTO-powered implements or for pulling large ground engaging implements and thus feature robustly designed chassis and drive systems. Tractor 5 includes a chassis 10 supported by front wheels 12 and by rear wheels 14 on either side thereof. It is typical in tractors of this type to feature only limited, if any, suspension movement between the wheels and the frame. An operator cab 16 is provided and is commonly supported by a suspension arrangement disposed between the chassis and the cab structure to improve operator comfort. While it is common to pivotally connect the forward end of cabs to tractor chassis and provide spring elements allowing vertical motion at the rear of the cab, such arrangement do not provide adequate ride quality in larger 4WD tractors.

Figure 2:
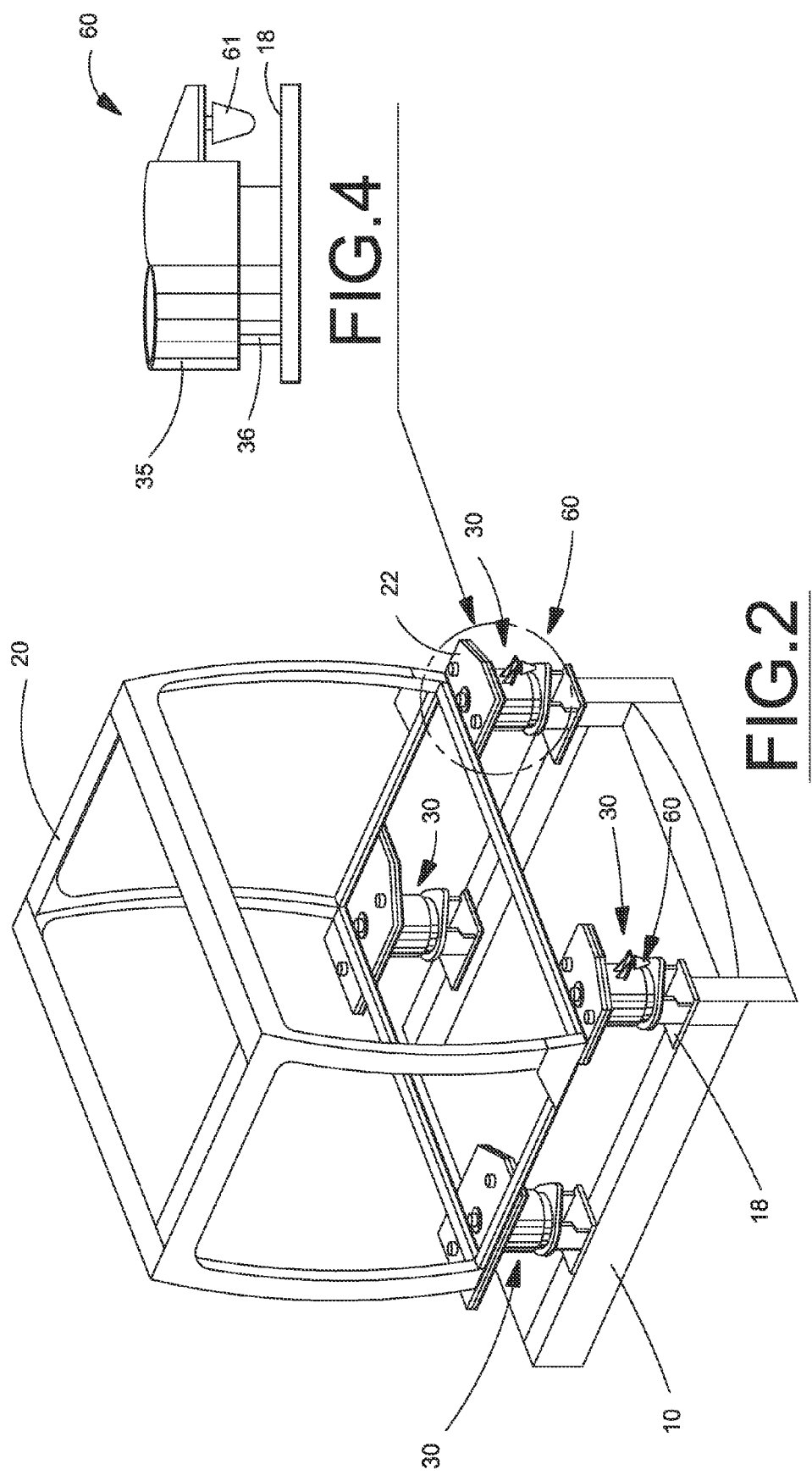
FIG. 2 is a perspective view of a roll over protection system as it is attached to the tractor using a plurality of suspension mounts incorporating the present invention.

Referring to FIG. 2 in conjunction with FIG. 1, a roll over protection system (ROPS) frame 20 is shown. The frame 20 is integrated into the structure of the cab 16 to strengthen the cab structure to withstand a vehicle roll over and thus protect the operator inside. In order for the ROPS frame 20 to properly function, the connection between the frame 20 and the vehicle chassis 10 must be capable of withstanding the roll over loads. The present invention provides a cab suspension system comprising a plurality of cab suspension devices 30 which interconnect the cab 16 and ROPS frame 20 with the vehicle chassis 10. A plurality of ROPS base supports 22 on the cab provide a convenient connection point for the suspension devices 30. The suspension devices 30 are configured to allow sufficient movement of the cab 16 for operator comfort, yet limit such movement when a roll over load must be transferred from the ROPS frame 20 to the chassis 10.

Figure 3:
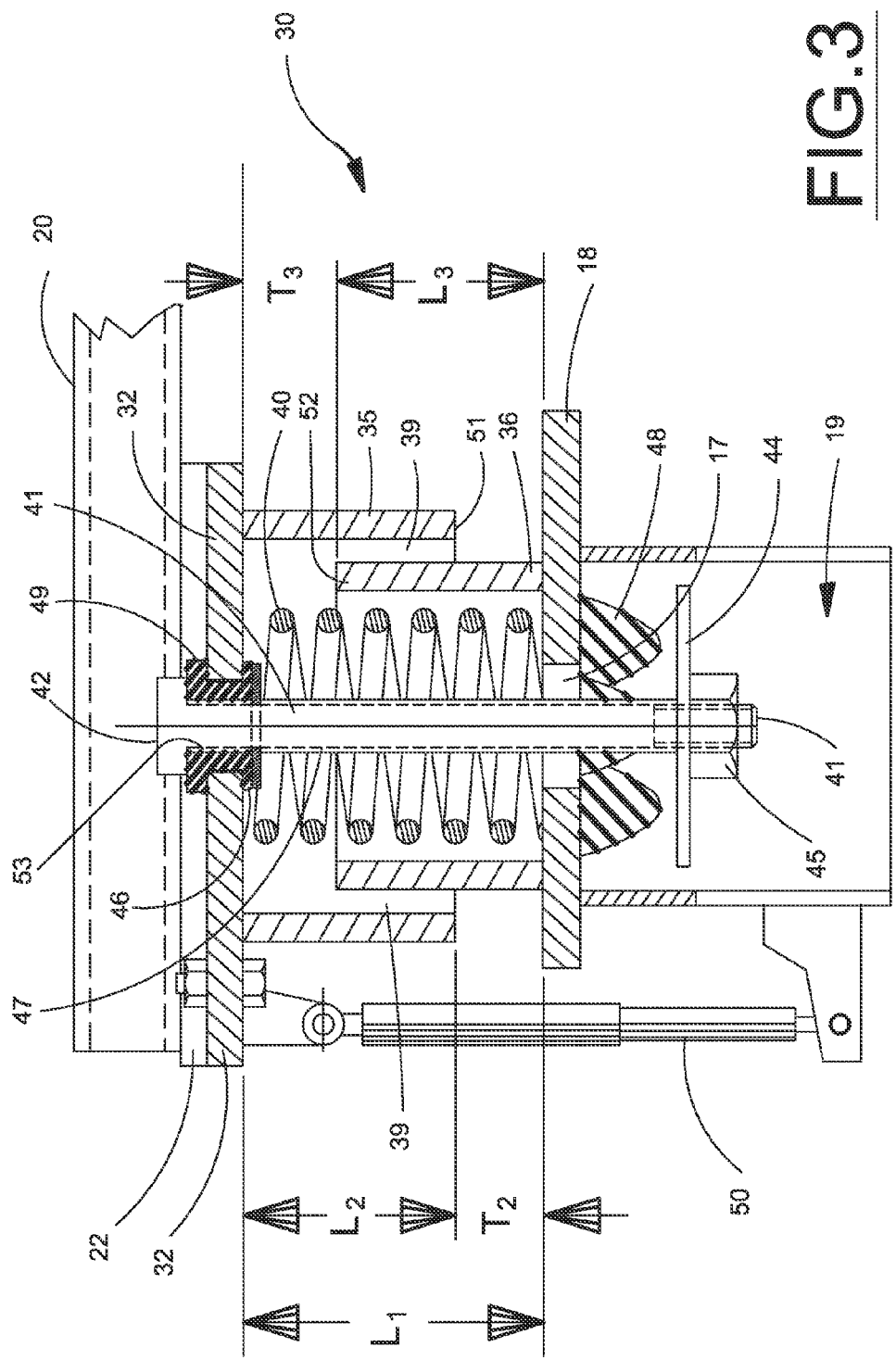
FIG. 3 is an elevation view of a one of a plurality of cab suspension mounting devices presenting a first embodiment of the present invention.

Now referring to FIG. 3, one embodiment of the cab suspension device 30 is shown comprising a cab mounting plate 32 and a chassis mounting plate 18. The mounting plates 18, 32 provide generally parallel and spaced-apart surfaces between which a spring 40 is positioned. Spring 40 is captured between the surfaces of plates 18, 32 and normally held in position by the weight of the cab. A spring retainer 41 with an upper retainer 42 and a lower nut 45 with a capture plate 44 is provided to limit the maximum spring extension and thus maximum extension of the suspension device 30. The connection of spring retainer 41 to the cab mounting plate 32 includes a resilient isolator element 49 held in position by a washer 46 and a first spacer 53 to allow minor deflection of the spring retainer 41 relative to the cab mounting plate 32 without imposing significant bending loads on the retainer 41. This provision is necessary since the suspension device 30 may experience lateral and angular deflection in addition to vertical deflections. First spacer 53 is positioned to maintain a pre-determined spacing between washer 46 and upper retainer 42 so that the isolator element 49 is not compressed by assembly of the spring retainer 41. The spring retainer 41 also features a second spacer 47 which maintains a predetermined spacing between the washer 46 and the capture plate 44. The first and second spacers 53, 47 allow the components of the spring retainer 41 assembly to be held rigidly together to prevent unintentional movement of the individual components which would result in noise. The configuration of the rigid spring retainer 41 assembly also minimizes bending loads on the retainer 41 that would result from lateral movement of the suspension device 30 thereby maintaining the spring retainer under generally tensile loading, even during roll over events.

An aperture 17 in chassis mounting plate 18 is sized to be larger than the spring retainer 41 to allow limited lateral movement of the spring retainer 41 without contacting the mounting plate 18. Similarly, space 19 is provide on the opposite side of mounting plate 18 to allow unrestricted movement of the lower portion of the spring retainer 41 and capture plate 44. Resilient bumper 48, discussed in further detail below, engages the lower portion of spring retainer 41 adjacent to the capture plate 44 to further limit lateral deflection of the retainer 41 to minimize the potential for contact with the chassis or suspension device 30 structure. Alignment provisions may be provided on the plates 18, 32 to maintain the spring 40 generally centered on the axis of spring retainer 41 to prevent contact between the spring 40 and other components of the suspension device 30 during operation. Such provisions may include damps to hold the spring ends in a fixed position or resilient members to urge the spring end into the desired positions. Resilient members are preferred for noise reduction qualities. A suspension damper 50 may be provided to introduce damping to the cab suspension system.

Cab suspension device 30 also comprises first and second ROPS limiters 35, 36, respectively. In the preferred embodiment, first and second ROPS limiters 35, 36 are configured as generally cylindrical tubes co-axially arranged on a common axis with the spring 40. First ROPS limiter 35 is connected to the cab mounting plate 32 and extends downwardly while second ROPS limiter is connected to the chassis mounting plate 18 and extends upwardly therefrom.

First ROPS limiter 35 has a larger diameter than second ROPS limiter 36 so that an annular space 39 exists when the ROPS limiters are co-axially arranged. The annular space is sufficient to permit lateral deflections anticipated during normal tractor operations without contact between the ROPS limiters 35, 36. In the event of a tractor roll over, the loadings on the suspension device 30 exceed normal operation loads, thus potentially causing greater lateral deflection of the spring 40 than the annular space 39 will permit. In such instances, the first and second ROPS limiters will contact one another, preventing further lateral deflection of the spring 40 to provide a sufficiently capable load path for ROPS frame 20 loads from the cab to the vehicle chassis.

The length of each of the first and second ROPS limiters is less than the total space between the mounting plates 18, 32 when the spring 40 is at a nominal extension, illustrated by dimension $L_1$ in FIG. 3. The lengths of the first and second ROPS limiters 35, 36 are shown as $L_2$ and $L_3$. The difference in lengths between $L_1$ and $L_2$ or $L_3$ determines the amount of spring 40 compression that may occur before the free ends 51, 52 of the ROPS limiters 35, 36 contact the opposing mounting plate 18, 32, represented by dimension "T". Dimension "T" is configured to allow normal cab movement without causing contact between the ROPS limiters 35, 36 and the opposing mounting plates 18, 32. In the event of a tractor roll over, the loadings on the suspension device 30 exceed normal operation loads, thus potentially causing greater vertical deflection of the spring 40 than the ROPS limiters 35, 36 will permit. In such instances, the free ends of the first and second ROPS limiters will make contact with the opposing one another, preventing further vertical deflection of the spring 40 to provide a sufficiently capable load path for ROPS frame 20 loads from the cab to the vehicle chassis. Ideally, the length of the first and second ROPS limiters 35, 36 is equal so that simultaneous contact between the free ends 51, 52 and the respective opposing mounting plates 18, 32 occurs; however, in the event that the lengths $L_2$ or $L_3$ differ, then the available travel distance will also vary, shown as $T_2$ and $T_3$. In this case, the ROPS limiter having the greater length will contact its respective opposing mounting plate first and bear the roll over load.

The lengths of the first and second ROPS limiters 35, 36, shown as $L_2$ and $L_3$, are also selected so that the first and second ROPS limiters 35, 36 will remain overlapped during maximum extension of the suspension device 30. This is accomplished by selecting $L_2$ and $L_3$ so that the summation of the length exceeds that of the maximum extension allowed by spring retainer 41 and capture plate 44. This assures that the ROPS limiters 35, 36 will restrain lateral deflections of the suspension device, even under maximum extension of the suspension device.

Resilient bumpers are incorporated in order to limit the impact of spring compression or extension to the limits allowed by the suspension device 30. During spring 40 extension, a resilient bumper 48 is provided to cushion contact between capture plate 44 and the chassis mounting plate 18. During spring 40 compression, a compression bumper 60 (shown in FIG. 2) is provided to cushion the impact of the ROPS limiters 35, 36 with their respective frame members. Compression bumper 60 comprises a resilient bumper element 61 configured to contact mounting plate 18 or a similar fixed member on the chassis. Bumper element 61 preferably makes contact with the mounting plate 18 prior to contact between the ROPS limiters 35, 36 and the opposing mounting plates 18, 32 so that normal operation suspension compressions are damped or cushioned during suspension compression. During a roll over event, the structure of compression bumper 60 is designed to yield, as necessary, to allow the ROPS limiters 35, 36 to contact the opposing mounting plates 18, 32 and provide a stronger load path for the ROPS loads to the vehicle chassis.

It is noted that the suspension elements of the cab suspension device 30 may be provided elsewhere on the tractor leaving the ROPS limiters 35, 36 and their opposing mounting plates 18, 32 in the device 30. The resultant device will still provide the necessary load path for transferring RAPS loads from the cab to the chassis, but will potentially result in a less compact assembly.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A mounting device for connecting in a spaced-apart relation a suspended cab having a roll over protection structure to an agricultural tractor chassis comprising:
a first limiter connected to the cab for movement therewith, the first limiter having a first end portion disposed adjacent to the cab, a first perimeter wall extending generally perpendicular from the first end portion toward the chassis for a first length, the first perimeter wall surrounding a first interior region arranged along an axis; and
a second limiter connected to the chassis for movement therewith, the second limiter having a second end portion disposed adjacent to the chassis, a second perimeter wall extending generally perpendicular from the second end portion toward the cab for a second length, the second perimeter wall surrounding a second interior region arranged generally along the axis, the second perimeter wall positioned to extend-into the first interior region and create an annular space between the first and the second perimeter walls,
a retainer positioned axially through the first and second limiters and having a first end positioned beyond the first end portion of the first limiter and a second end positioned beyond the second end portion of the second limiter to secure the first end portion and the second end portion of the first and second limiters from extending past first and second ends of the retainer such that the retainer permits at least axial movement of the first and second limiters while preventing axial separation thereof,
wherein the annular space between the first perimeter wall and the second perimeter wall permits limited lateral movement of the first and second limiters and the retainer, the lateral movement limited by contact of the first perimeter wall with the second perimeter wall, and
wherein the retainer and the annular space between the perimeter walls of the first and second limiters cooperate together to permit axial and lateral movement of the first and the second limiters.

2. The mounting device of claim 1, wherein a spring is positioned about the retainer and extending between the first end portion of the first limiter and the second end portion of the second limiter to allow at least axial movement of first and second limiters and the retainer, and wherein the retainer is positioned to prevent separation of the first and second limiters beyond a predetermined maximum separation, wherein the total of the first length and the second length is greater than the maximum separation.

3. The mounting device of claim 2, wherein the spring is positioned to maintain a space between the cab and the chassis between a minimum separation and the maximum separation during normal tractor operation.

4. The mounting device of claim 3, wherein the retainer is aligned on the axis.

5. The mounting device of claim 4, wherein the spring is aligned on the axis.

6. The mounting device of claim 1, wherein the first and the second perimeter walls are cylindrical.

7. The mounting device of claim 1, further comprising a compression bumper to cushion movement in the direction toward the minimum separation prior to contact of the first and the second limiters.

8. The mounting device of claim 7, further comprising a resilient bumper to cushion movement in the direction toward the maximum separation prior to the maximum separation.

9. The mounting device of claim 1, further comprising a damper connected at one end to a portion of the first limiter and at an opposite end to a portion of the second limiter.

10. The mounting device of claim 1, wherein at least one surface of the resilient bumper is non-planar.

11. A roll over protection structure connection device for a suspended cab on an agricultural tractor, the tractor having a ground-supported chassis, the connection device comprising:

a first limiter connected to the cab for movement therewith, the first limiter having a first end portion disposed adjacent to the cab, a first perimeter wall extending generally perpendicular from the first end portion toward the chassis, the first perimeter wall surrounding a first interior region arranged along an axis;

a second limiter connected to the chassis for movement therewith, the second limiter having a second end portion disposed adjacent to the chassis, a second perimeter wall extending generally perpendicular from the second end portion toward the cab, the second perimeter wall surrounding a second interior region arranged generally along the axis, the second perimeter wall positioned to extend extending into the first interior region to create an annular space between the first and the second perimeter walls;

a retainer positioned axially within the first and second perimeter walls and extending through the first end portion of the first limiter and the second end portion of the second limiter, the retainer having a first end positioned beyond the first end portion of the first limiter and a second end positioned beyond the second end portion of the second limiter, first and second ends of the retainer positioned adjacent the first and second end portions of the first and second limiter to prevent movement beyond the first and second ends of the retainer and to prevent separation of the first end portion and the second end portion of the first and second limiters beyond a predetermined maximum separation; and a spring positioned about the retainer to maintain a space between the cab and the chassis between a minimum separation and the maximum separation during normal tractor operation, the spring positioned to allow at least axial movement of first and second limiters and the retainer, wherein the spring, the retainer, and the annular space between the perimeter walls of the first and second limiters cooperate to permit axial and lateral movement of the first and the second limiters.

12. The connection device of claim 11, wherein the first and the second perimeter walls and the spring are concentrically arranged on the axis.

13. The connection device of claim 12, further comprising a resilient bumper to cushion movement in the direction toward the maximum separation prior to the maximum separation.

14. The connection device of claim 11, further comprising a compression bumper to cushion movement in the direction toward the minimum separation prior to contact of the first and the second limiters.

15. The connection device of claim 11, further comprising a damper connected at one end to a portion of the first limiter and at an opposite end to a portion of the second limiter.

16. A roll over protection structure connection device for a suspended cab on an agricultural tractor, the tractor having a ground-supported chassis, the connection device comprising:

a first limiter connected to the cab for movement therewith, the first limiter having a first end portion disposed adjacent to the cab, a first perimeter wall extending from the first end portion toward the chassis for a first length, the first perimeter wall surrounding a first interior region arranged along an axis;

a second limiter connected to the chassis for movement therewith, the second limiter having a second end portion disposed adjacent to the chassis, a second perimeter wall extending generally from the second end portion toward the cab for a second length, the second perimeter wall surrounding a second interior region arranged generally along the axis, the second perimeter wall positioned to extend into the first interior region and create an annular space between the first and the second perimeter walls to permit lateral movement of first and second limiters;

a retainer positioned axially through the first and second limiters and having a first end positioned beyond the first end portion of the first limiter and a second end positioned beyond the second end portion of the second limiter to secure the first end portion and the second end portion of the first and second limiters from extending past first and second ends of the retainer such that the retainer permits at least axial movement of the first and second limiters while preventing axial separation thereof beyond a predetermined maximum separation defined by the first and second ends of the retainer; and at least one of
(a) a resilient bumper positioned on an outer surface of the second end portion of the second limiter, wherein a portion of the second end of the retainer contacts the resilient bumper to cushion movement in the direction toward the maximum separation when such axial movement occurs,
(b) a compression bumper to cushion movement in the direction toward the minimum separation prior to contact of the first and the second limiters.

17. The connection device of claim 16, further including a spring positioned about the retainer to provide a space between the cab and the chassis between a minimum separation and the maximum separation during normal tractor operation, the spring positioned to allow at least axial movement of first and second limiters and the retainer, and wherein the spring, the retainer, and the annular space between the perimeter walls of the first and second limiters cooperate to permit axial and lateral movement of the first and second limiters.

18. The connection device of claim 17, further comprising a damper connected at one end to a portion of the first limiter and at an opposite end to a portion of the second limiter.

19. The connection device of claim 16, wherein at least one surface of the resilient bumper is non-planar.

* * * * *